US011478926B2

United States Patent
Shibata

(10) Patent No.: US 11,478,926 B2
(45) Date of Patent: Oct. 25, 2022

(54) OPERATION CONTROL DEVICE FOR ROBOT, ROBOT CONTROL SYSTEM, OPERATION CONTROL METHOD, CONTROL DEVICE, PROCESSING DEVICE AND RECORDING MEDIUM

(71) Applicant: OMRON Corporation, Kyoto (JP)

(72) Inventor: Yoshiya Shibata, Tokyo (JP)

(73) Assignee: OMRON Corporation, Kyoto (JP)

( * ) Notice: Subject to any disclaimer, the term of this patent is extended or adjusted under 35 U.S.C. 154(b) by 192 days.

(21) Appl. No.: 16/977,478

(22) PCT Filed: Feb. 20, 2019

(86) PCT No.: PCT/JP2019/006183
§ 371 (c)(1),
(2) Date: Sep. 2, 2020

(87) PCT Pub. No.: WO2019/176478
PCT Pub. Date: Sep. 19, 2019

(65) Prior Publication Data
US 2021/0053214 A1 Feb. 25, 2021

(30) Foreign Application Priority Data

Mar. 15, 2018 (JP) .............................. JP2018-047704

(51) Int. Cl.
*B25J 9/16* (2006.01)
*B25J 13/08* (2006.01)
(52) U.S. Cl.
CPC ............. *B25J 9/163* (2013.01); *B25J 9/1635* (2013.01); *B25J 13/08* (2013.01)
(58) Field of Classification Search
CPC .......... B25J 9/161; B25J 9/163; B25J 9/1697; G06N 3/0454; G06N 3/08; G06N 3/02; G06N 3/0472; G06N 20/00; G06N 7/005
(Continued)

(56) References Cited

U.S. PATENT DOCUMENTS 10,603,790 B2 * 3/2020 Gotou ..................... G06N 3/008
10,974,393 B2 * 4/2021 Yoshiura ................ B25J 9/1664
(Continued)

FOREIGN PATENT DOCUMENTS

JP   H05101028    4/1993
JP   2014240110   12/2014
(Continued)

OTHER PUBLICATIONS

"International Search Report (Form PCT/ISA/210) of PCT/JP2019/006183," dated May 28, 2019, with English translation thereof, pp. 1-4.
(Continued)

*Primary Examiner* — Dalena Tran
(74) *Attorney, Agent, or Firm* — JCIPRNET

(57) ABSTRACT

An operation control device for a robot comprises: an input part inputting at least one operation candidate, and a captured image including an object to be processed; a first learning device that has finished learning performed according to first learning data to output a first evaluation value indicating evaluation of each operation candidate when the robot performs a first processing operation upon input of the captured image and the operation candidate; a second learning device that has finished learning performed according to second learning data which differs from the first learning data, to output a second evaluation value indicating evaluation of each operation candidate when the robot performs a second processing operation upon input of the captured image and the operation candidate; and an evaluation part that, based on at least one of the first evaluation value and the second evaluation value, calculates a command value.

13 Claims, 8 Drawing Sheets

(58) Field of Classification Search
USPC .............................................. 700/245; 706/10
See application file for complete search history.

(56) References Cited

U.S. PATENT DOCUMENTS

| | | | |
|---|---|---|---|
| 11,034,018 B2* | 6/2021 | Kusano | ................... G06T 7/70 |
| 2013/0151007 A1 | 6/2013 | Valpola et al. | |
| 2016/0096272 A1 | 4/2016 | Smith et al. | |
| 2017/0140300 A1* | 5/2017 | Funakoshi | ............. G06N 20/00 |
| 2017/0252922 A1 | 9/2017 | Levine et al. | |
| 2017/0285584 A1 | 10/2017 | Nakagawa et al. | |
| 2018/0330200 A1* | 11/2018 | Shibata | ................... G06N 3/04 |

FOREIGN PATENT DOCUMENTS

| | | |
|---|---|---|
| JP | 2017030135 | 2/2017 |
| JP | 2017097317 | 6/2017 |
| JP | 2017185577 | 10/2017 |
| JP | 2017185578 | 10/2017 |
| JP | 2018027581 | 2/2018 |
| WO | 2018008503 | 1/2018 |

OTHER PUBLICATIONS

"Written Opinion of the International Searching Authority (Form PCT/ISA/237) of PCT/JP2019/006183," dated May 28, 2019, with English translation thereof, pp. 1-10.
"Search Report of Europe Counterpart Application", dated Dec. 13, 2021, p. 1-p. 11.

* cited by examiner

| Input image | Operation candidate | Success or failure of gripping (success=1, failure=0) |
|---|---|---|
| Image 1 | M1(x1, y1, θ1) | 1 |
| Image 2 | M2(x2, y2, θ2) | 0 |
| Image 3 | M3(x3, y3, θ3) | 1 |
| ... | ... | ... |

| Input image | Operation candidate | Movement of other components (not moved=1, moved=0) |
|---|---|---|
| Image 1 | M1(x1, y1, θ1) | 1 |
| Image 2 | M2(x2, y2, θ2) | 0 |
| Image 3 | M3(x3, y3, θ3) | 1 |
| ... | ... | ... |

FIG. 8

| | M1 | M2 | M3 | ... | Mn |
|---|---|---|---|---|---|
| First learning device | p1=0.5 | p1=0.6 | p1=0.7 | | p1=0.2 |
| Second learning device | p2=0.9 | p2=0.3 | p2=0.8 | | p2=0.4 |
| Third learning device | p3=0.3 | p3=0.4 | p3=0.1 | | p3=0.5 |

FIG. 9

OPERATION CONTROL DEVICE FOR ROBOT, ROBOT CONTROL SYSTEM, OPERATION CONTROL METHOD, CONTROL DEVICE, PROCESSING DEVICE AND RECORDING MEDIUM

CROSS-REFERENCE TO RELATED APPLICATION

This application is a 371 application of the International PCT application serial no. PCT/JP2019/006183, filed on Feb. 20, 2019, which claims the priority benefits of Japan Patent Application No. 2018-047704, filed on Mar. 15, 2018. The entirety of each of the above-mentioned patent applications is hereby incorporated by reference herein and made a part of this specification.

BACKGROUND

Technical Field

The invention relates to an operation control device for a robot, an operation control method, an operation control program, and a processing device.

Description of Related Art

Conventionally, various methods have been proposed for controlling the operation of a robot. For example, Patent Document 1 discloses a control device that controls a robot arm based on a shape model of an object included in image data in the control of gripping the object with the robot arm. This document also discloses a learning device that outputs the success probability of gripping with the image data as an input in order to control the robot arm.

RELATED ART

Patent Document

[Patent Document 1] Japanese Laid-Open No. 2017-185578

SUMMARY

Problems to be Solved

However, when using such a learning device to control the operation of a robot, it is necessary for the learning device to re-learn in order to add an operation of the robot to be controlled. That is, after learning data related to a newly added operation of the robot is added, it is necessary for the learning device to re-learn. However, when the learning data is added to the existing learning device and re-learning is performed, there is a problem that the learning data may become enormous and it may take time to re-learn.

Nevertheless, such a problem is not limited to the operation control of a robot, and may occur in all processing devices that perform output for a predetermined process by a learning device, for example. The invention has been made to solve this problem, and the invention provides an operation control device for a robot, an operation control method, an operation control program, and a processing device that can perform learning efficiently when learning additional processing.

Means for Solving the Problems

The disclosure provides an operation control device for a robot that operates with respect to an object to be processed. The operation control device includes: an input part inputting a captured image obtained by imaging at least the object to be processed, and at least one operation candidate for the robot; a first learning device that has finished learning performed according to first learning data in order to output a first evaluation value indicating evaluation of each operation candidate when the robot performs a first processing operation upon input of the captured image and the at least one operation candidate; a second learning device that has finished learning performed according to second learning data, which differs from the first learning data, in order to output a second evaluation value indicating evaluation of each operation candidate when the robot performs a second processing operation upon input of the captured image and the at least one operation candidate; and an evaluation part calculating a command value for operating the robot based on at least one of the first evaluation value and the second evaluation value.

According to this configuration, instead of training one learning device to consider all the processing operations, when a new processing operation is added, a learning device that considers only the processing operation is additionally generated. That is, in the invention, in order to perform the second processing operation different from the first processing operation, the second learning device that learns according to learning data different from that of the first processing operation is separately generated, and the operation command is calculated in the evaluation part in consideration of the outputs of the first and second learning devices. Accordingly, the burden of learning of the learning devices can be reduced.

The object to be processed refers to an object such as a part or a transported article that is to be processed by the robot, and the processing operation refers to an operation performed by the robot with respect to the object to be processed, such as gripping, transporting, and positioning of the object to be processed. Further, the operation candidate refers to a candidate for the operation performed by the robot when the robot performs the processing operation, such as forward/backward movement, elevation, and rotation of the robot hand. In addition to preparing operation candidates having different types of operations such as elevation and rotation, for example, even for the same type of operation, two rotation operations having different rotation angles can also be used as operation candidates.

In the above operation control device, the first evaluation value may be a probability value indicating a success probability of a first operation candidate, and the second evaluation value may be a probability value indicating a success probability of a second operation candidate.

In the above operation control device, the evaluation part may calculate the command value based on the operation candidate in which each evaluation value is equal to or more than a predetermined value.

In the above operation control device, the evaluation part may calculate the command value by performing weighting based on each processing operation on the first evaluation value and the second evaluation value.

In the above operation control device, the second evaluation value may be an evaluation value of an event that is likely to occur due to at least one of the first processing operation and the second processing operation.

The above operation control device may further include a third learning device that has finished learning performed according to third learning data, which differs from the first learning data and the second learning data, in order to output a third evaluation value indicating an event that is likely to occur due to at least one of the first processing operation and the second processing operation upon input of the captured image and the at least one operation candidate, and the evaluation part may calculate the command value by using the third evaluation value as well.

The above operation control device may further include an operation candidate generating part that outputs the first operation candidate suitable for the first processing operation and the second operation candidate suitable for the second processing operation upon input of the captured image.

In the above operation control device, the operation candidates of the first processing operation and the second processing operation may include a movement vector for the robot to operate.

The disclosure provides a robot control system, including: a robot that performs processing with respect to an object to be processed; and any operation control device described above. The robot control system is configured for the robot to operate by a command value calculated from the operation control device.

The disclosure provides an operation control method for a robot that operates with respect to an object to be processed. The operation control method includes: a step of inputting a captured image obtained by imaging at least the object to be processed, and at least one operation candidate for the robot; a step of preparing a first learning device that has finished learning performed according to first learning data in order to output a first evaluation value indicating evaluation of each operation candidate when the robot performs a first processing operation upon input of the captured image and the at least one operation candidate; a step of preparing a second learning device that has finished learning performed according to second learning data, which differs from the first learning data, in order to output a second evaluation value indicating evaluation of each operation candidate when the robot performs a second processing operation upon input of the captured image and the at least one operation candidate; a step of outputting the first evaluation value from the captured image and the operation candidate by the first learning device; a step of outputting the second evaluation value from the captured image and the operation candidate by the second learning device; and a step of calculating a command value for operating the robot based on at least one of the first evaluation value and the second evaluation value.

The disclosure provides a non-transient computer-readable recording medium, recording an operation control program for a robot that operates with respect to an object to be processed. The operation control program enables a computer to perform: a step of inputting a captured image obtained by imaging at least the object to be processed, and at least one operation candidate for the robot; a step of preparing a first learning device that has finished learning performed according to first learning data in order to output a first evaluation value indicating evaluation of each operation candidate when the robot performs a first processing operation upon input of the captured image and the at least one operation candidate; a step of preparing a second learning device that has finished learning performed according to second learning data, which differs from the first learning data, in order to output a second evaluation value indicating evaluation of each operation candidate when the robot performs a second processing operation upon input of the captured image and the at least one operation candidate; a step of outputting the first evaluation value from the captured image and the operation candidate by the first learning device; a step of outputting the second evaluation value from the captured image and the operation candidate by the second learning device; and a step of calculating a command value for operating the robot based on at least one of the first evaluation value and the second evaluation value.

The disclosure provides a control device for an object to be controlled. The control device includes: an input part inputting environment information related to the object to be controlled, and at least one processing candidate for the object to be controlled; a first learning device that has finished learning performed according to first learning data in order to output a first evaluation value indicating evaluation of each processing candidate when performing a first process on the object to be controlled upon input of the environment information and the at least one processing candidate; a second learning device that has finished learning performed according to second learning data, which differs from the first learning data, in order to output a second evaluation value indicating evaluation of each processing candidate when performing a second process on the object to be controlled upon input of the environment information and the at least one processing candidate; and an evaluation part calculating a command value for controlling the object to be controlled based on at least one of the first evaluation value and the second evaluation value.

The disclosure provides a processing device for performing a predetermined process. The processing device includes: an input part inputting at least one processing candidate; a first learning device that has finished learning performed according to first learning data in order to output a first evaluation value indicating evaluation of each processing candidate when performing a first process upon input of the at least one processing candidate; a second learning device that has finished learning performed according to second learning data, which differs from the first learning data, in order to output a second evaluation value indicating evaluation of each processing candidate when performing a second process upon input of the at least one processing candidate; and an evaluation part determining the processing candidate of at least one of the first process and the second process based on at least one of the first evaluation value and the second evaluation value.

Effects

According to the invention, when additional processing is learned, the learning can be performed efficiently.

BRIEF DESCRIPTION OF THE DRAWINGS

FIG. 8 is an example of learning data.

FIG. 9 is an example of an output from the learning device.

DESCRIPTION OF THE EMBODIMENTS

Hereinafter, an embodiment of an operation control device for a robot, an operation control method, and an operation control program according to the invention will be described with reference to the drawings. However, the present embodiment described hereinafter is merely an example of the invention in all aspects. It goes without saying that various improvements and modifications can be made without departing from the scope of the invention. In other words, when implementing the invention, a specific configuration according to the embodiment may be adopted as appropriate. The data that appears in the present embodiment is described in natural language, but more specifically, it is specified by a computer-recognizable pseudo language, a command, a parameter, a machine language, or the like.

1. Application Example

Figure 1:
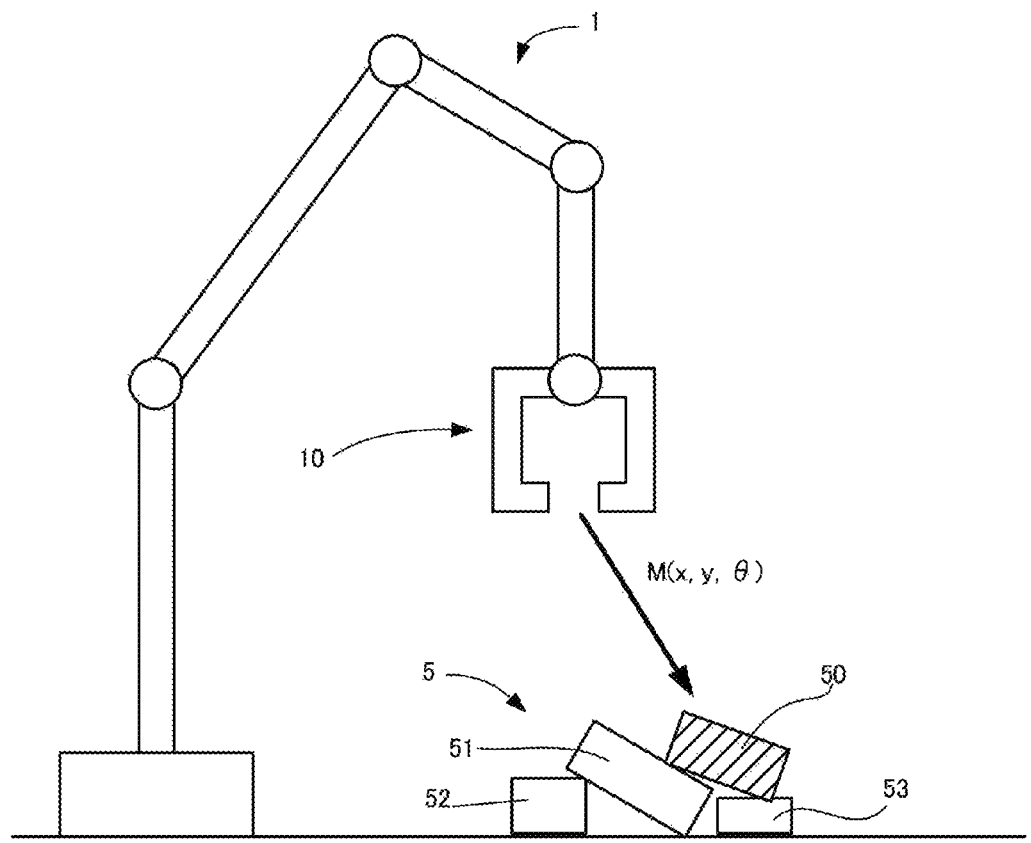
FIG. 1 is a schematic diagram showing an example of a robot used in an embodiment of an operation control device for a robot according to the invention.

Hereinafter, the operation control device for a robot according to the present embodiment will be described with reference to FIG. 1 and FIG. 2. FIG. 1 is a schematic diagram of the robot according to the present embodiment, and FIG. 2 is a block diagram showing a functional configuration of a control system for the robot, which includes the operation control device.

The control system is a system for controlling an operation of the robot, and gives an operation command for appropriately performing processing to an object to be processed by the robot. Here, as shown in FIG. 1, a case where the robot 1 having a robot hand 10 gives an operation command for gripping a target component 50 among a plurality of components (objects to be processed) 5 will be described as an example.

Figure 2:
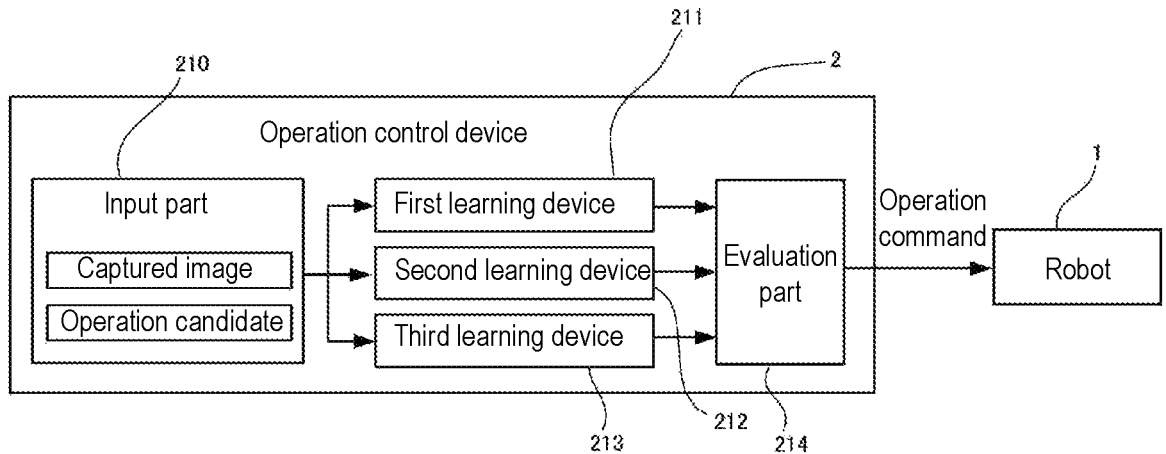
FIG. 2 is a functional block diagram of an embodiment of the operation control device according to the invention.

In order to give such an operation command, the operation control device 2 inputs a captured image obtained by imaging the robot hand 10 and the target component 50, as shown in FIG. 2, and a plurality of operation candidates that the robot hand 10 should operate in order to grip the target component 50 to learning devices 211 to 213 as inputs. That is, the learning devices 211 to 213 receive the same input. In the present embodiment, three learning devices 211 to 213 are provided. Here, the first learning device 211 will be described first.

When receiving the captured image and the plurality of operation candidates as inputs, the first learning device 211 learns so as to output a success probability of being able to grip the target component of each operation candidate as a first probability value. The captured image is obtained by imaging the robot hand 10 and the target component 50, and is for extracting the current positions of the robot hand 10 and the target component 50. However, when the robot hand 10 is placed at a fixed initial position, the captured image can also be prepared by imaging only the target component 50.

Further, in the present embodiment, as shown in FIG. 1, a movement vector Mn(xn, yn, θn) (n is an integer) with which the robot hand 10 moves toward the target component 50 is used as the operation candidate. Here, x represents the amount of movement in the x direction, y represents the amount of movement in the y direction, and θ represents the inclination of the robot hand 10. By setting a plurality of movement vectors set in this manner as the operation candidates and inputting the operation candidates together with the captured image, the first learning device 211 outputs the success probability that the robot hand 10 can grip the target component 50 by each operation candidate as the first probability value. Then, as shown in FIG. 2, in an evaluation part 214 of the operation control device 2, one operation candidate is selected based on the calculated first probability value, and the movement vector of the selected operation candidate is transmitted to the robot 1 as the operation command.

At this time, there are various methods for selecting the operation candidate in the evaluation part 214, but the operation candidate showing the highest first probability value can be selected, for example. If the first probability value is equal to or less than a predetermined value, instead of giving the operation command, the probability value can be output again with the first learning device 211 after an operation candidate different from the operation candidate used for input is prepared.

Figure 3:
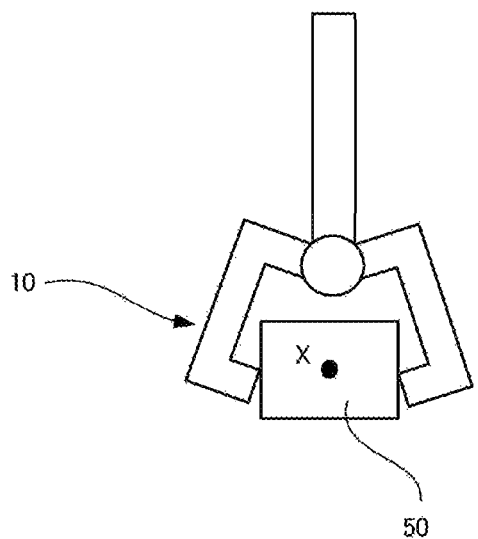
FIG. 3 is a diagram showing gripping of a target component performed by a robot hand.

Such a first learning device 211 can be configured by machine learning such as a neural network. In the first learning device 211, the operation candidate is selected in order for the robot hand 10 to grip the target component 50, but it is conceivable to enable the robot hand 10 to grip the target component 50 by adding a further condition. For example, besides simply gripping the target component 50, considering the handling of the target component 50, it may be desired to add a condition that enables the robot hand 10 to grip on two sides of the center X of the target component 50, as shown in FIG. 3. In that case, it is necessary for the first learning device 211 to re-learn so as to output a success probability for the robot hand 10 to reach the center of the target component 50.

However, when the first learning device 211 re-learns, the first learning device 211 has to re-learn after additional learning data is added to the learning data of the first learning device 211. That is, if all the conditions are learned with one learning device, it is difficult to collect learning data that satisfies a complex condition, and if additional learning is performed, the output of the original learning result that has been established cannot be guaranteed, which is inefficient. Therefore, in the present embodiment, the operation of the robot hand 10 related to the additional condition is performed by the second learning device 212 different from the first learning device 211, and a second probability value indicating the success probability of each operation candidate under the added condition is output. Then, in the evaluation part 214, the operation command is calculated in consideration of both the first probability value of the operation candidate selected by the first learning device 211 and the second probability value of the operation candidate output by the second learning device 212. That is, instead of training the first learning device 211 to consider all the conditions, when a condition is added, the second learning device 212 is additionally generated to consider only the condition, and the operation command is calculated in the evaluation part 214 in consideration of the outputs of both the first learning device 211 and the second learning device 212. Accordingly, the burden of learning of the learning devices can be reduced.

Similarly, the operation control device 2 of the present embodiment includes the third learning device 213. When gripping the target component 50 with the robot hand 10, the third learning device 213 outputs a third probability value indicating the probability of being able to grip the target component 50 without affecting other components. For example, the third learning device 213 can output a probability that the robot hand 10 can grip the target component 50 without changing the positions of the other components 51 to 53 shown in FIG. 1 in the process of gripping the target component 50. Regarding such an additional condition, the third learning device 213 that performs learning separately from the first and second learning devices 211 and 312 is generated, and the operation command is calculated in the evaluation part 214 in consideration of the third probability value, which is the output, together with the first and second probability values. As described above, the number of the learning devices is not particularly limited, and a new learning device can be generated each time an additional condition is added.

As described above, in the present embodiment, when control is performed for the robot 1 to perform a predetermined target operation, instead of training one learning device to satisfy all the conditions, the conditions of the operation to be performed by the robot are divided, the operation of the robot 1 is learned for each condition, and the operation is evaluated by the learning device for each condition. Then, the operation command to be performed by the robot 1 is calculated by comprehensively considering the evaluation of the operation output by each learning device. Further, when considering the evaluation output by each learning device, each evaluation may be considered equally or may be weighted. Furthermore, a priority order of evaluation may be set so that, for example, when one evaluation is not equal to or more than a predetermined evaluation, other evaluations are not taken into consideration. Thereby, it is possible to solve the problem when one learning device as described above is used.

2. Configuration Example

<2-1. Hardware Configuration>

Figure 4:
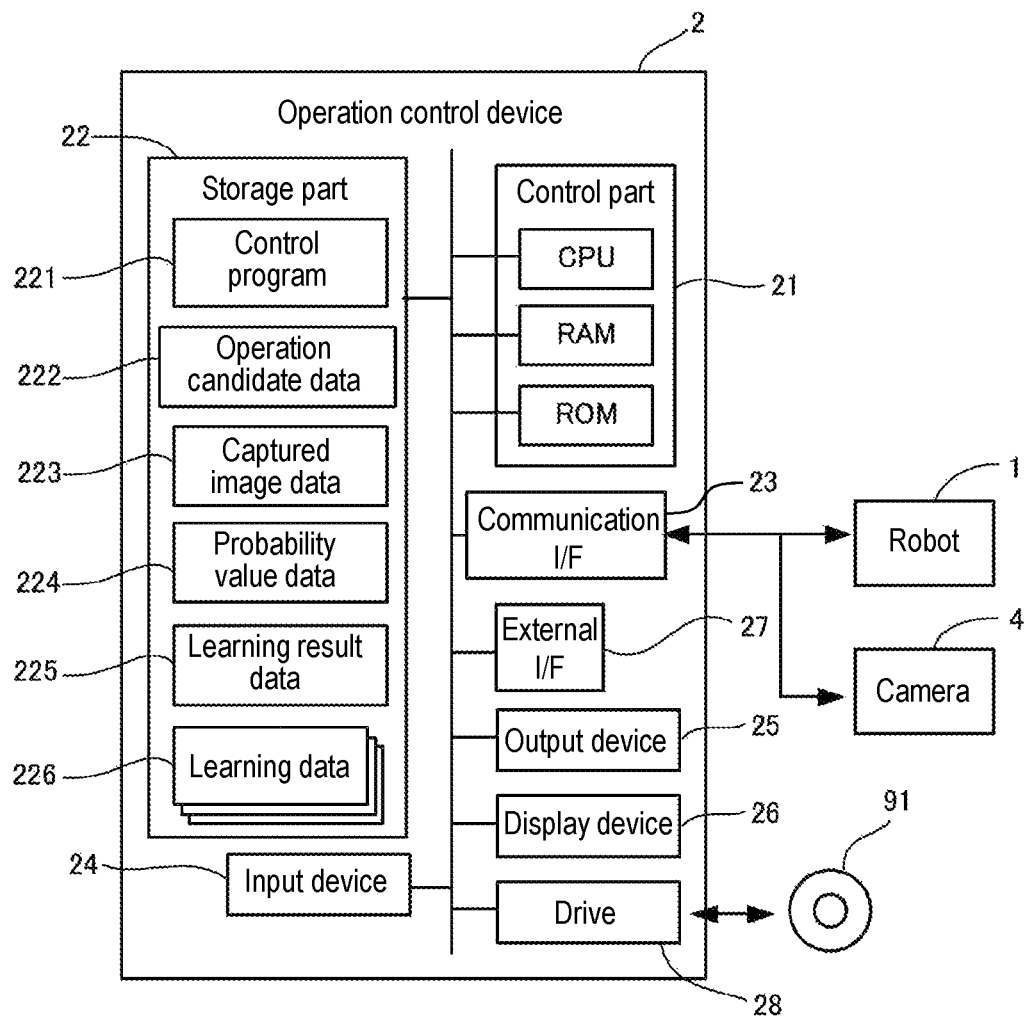
FIG. 4 is a block diagram showing a hardware configuration of the operation control device of FIG. 2.

Next, the hardware configuration of the control system including the operation control device 2 for the robot according to the present embodiment will be described further with reference to FIG. 4. FIG. 4 is a block diagram showing the hardware configuration of the control system for the robot according to the present embodiment.

<2-1-1. Robot>

As shown in FIG. 1, the robot 1 has the robot hand 10 capable of gripping components, and is configured so that the robot hand 10 moves vertically and horizontally and also tilts. However, the configurations of the robot 1 and the robot hand 10 are not particularly limited, and may be changed as appropriate to perform other operations.

<2-1-2. Control Device>

As shown in FIG. 4, the operation control device 2 for the robot according to the present embodiment is a computer electrically connected with a control part 21, a storage part 22, a communication interface 23, an input device 24, an output device 25, a display device 26, an external interface 27, and a drive 28. In FIG. 4, the communication interface and the external interface are described as "communication I/F" and "external I/F" respectively.

The control part 21 includes a CPU (Central Processing Unit), a RAM (Random Access Memory), a ROM (Read Only Memory), etc., and controls each constituent element according to information processing. The storage part 22 is, for example, an auxiliary storage device such as a hard disk drive or a solid state drive, and stores a control program 221 executed by the control part 21, operation candidate data 222, captured image data 223, probability value data 224, learning result data 225 indicating information related to the first to third learning devices 211 to 213, learning data 226 for training the first to third learning devices 211 to 213, etc. In addition, various types of data necessary for driving the operation control device 2 can also be stored.

The control program 221 is for receiving the above-mentioned input and performing output accordingly for the operation of the robot 1, and performs output by the first to third learning devices 211 to 213 described later. As described above, the operation candidate data 222 is data including the movement vectors of the robot hand 10, and has a large number of operation candidates. The operation candidate data is prepared in advance according to the type of the robot 1 and the type of the target article. The captured image data 223 is data related to the captured image obtained by imaging the robot hand 10 and the target component 50 as described above, and the probability value data 224 is data indicating the success probability of each operation candidate of the robot hand 10 output by each of the learning devices 211 to 213. The learning result data 225 is data for setting each of the learning devices 211 to 213 that have finished learning. In addition, the learning data 226 is data used for current learning of each of the learning devices 211 to 213. A detailed description of the learning will be provided later.

The communication interface 23 is, for example, a wired LAN (Local Area Network) module, a wireless LAN module, or the like, and is an interface for performing wired or wireless communication via a network. For example, the communication interface 23 can communicate with the robot 1 to transmit the operation command, or communicate with an external camera 4 to acquire the captured image captured by the camera 4. In addition, the communication interface 23 can also be used to transmit information related to control of the robot 1 to the outside. The input device 24 is, for example, a device for performing inputs such as a mouse, a keyboard, etc., and can input various instructions related to the operation of the robot 1 from a user. The output device 25 is a device for performing outputs such as a speaker. The display device 26 can be configured by a display or the like, and can display, for example, the results of the outputs from the learning devices 211 to 213. The external interface 27 is a USB (Universal Serial Bus) port or the like, and is an interface for connecting to an external device.

The drive 28 is, for example, a CD (Compact Disk) drive, a DVD (Digital Versatile Disk) drive, or the like, and is a device for reading a program stored in a storage medium 91. The type of the drive 28 may be selected as appropriate according to the type of the storage medium 91. At least one of the various types of data 221 to 226 stored in the above storage part 22 may be stored in the storage medium 91. Further, the captured image data 223 and the probability value data 224 can also be stored in the RAM of the control part 21.

The storage medium 91 is a medium that accumulates information such as a program by electrical, magnetic, optical, mechanical or chemical action so that a computer and other devices, machines, etc. can read the information such as the recorded program. The operation control device 2 may acquire the above-mentioned various types of data 221 to 226 from the storage medium 91.

Here, in FIG. 4, a disk type storage medium such as a CD or a DVD is illustrated as an example of the storage medium 91. However, the type of the storage medium 91 is not limited to the disk type, and may be other than the disk type.

As a storage medium other than the disk type, for example, a semiconductor memory such as a flash memory can be used.

Regarding the specific hardware configuration of the operation control device 2, the constituent elements may be omitted, replaced, or added as appropriate according to the embodiment. For example, the control part 21 may include a plurality of processors. The operation control device 2 may be configured by a plurality of information processing devices. In addition, the operation control device 2 may be a general-purpose desktop PC (Personal Computer), a tablet PC, or the like, in addition to the information processing device designed exclusively for the provided service.

<2-2. Functional Configuration of Operation Control Device>

Next, an example of the functional configuration of the operation control device according to the present embodiment will be described with reference to FIG. 2 and FIG. 4.

<2-2-1. Schematic Configuration>

As shown in FIG. 2, the control part 21 of the operation control device 2 expands the control program 221 stored in the storage part 22 in the RAM. Then, the control part 21 interprets and executes the program 221 expanded in the RAM by the CPU to control each constituent element. Thereby, as shown in FIG. 2, the control device 2 according to the present embodiment functions as a computer including the input part 210, the first to third learning devices 211 to 213, and the evaluation part 214.

<2-2-2. Input Part>

The input part 210 prepares the captured image and the operation candidate as inputs to the respective learning devices 211 to 213. For example, when the control of the robot 1 is started according to the instruction from the input device 24, the camera 4 is enabled to image the robot hand 10 and the target component 50 and acquire the captured image. The captured image can be stored in the storage part 22 as the captured image data 223. In addition, when the captured image is acquired in advance, the required captured image can also be read from the captured image data of the storage part 22. Further, a plurality of operation candidates are selected from the operation candidate data 222 of the storage part 22 for input. At this time, the operation candidates for input are randomly selected from the operation candidate data 222. In this way, the captured image and a plurality of operation candidates prepared by the input part 210 are input to the respective learning devices 211 to 213.

<2-2-3. First Learning Device>

In the first learning device 211, learning is performed by inputting the captured image and the plurality of operation candidates so as to output the first probability value indicating the success probability that the robot hand 10 can grip the target component 50 by the operation of each operation candidate. Here, the operation in which the robot hand 10 simply grips the target component 50 will be referred to as a first processing operation.

The first learning device 211 that performs such an output is configured by a neural network. Specifically, it is a multi-layered neural network used for so-called deep learning as shown in FIG. 5, and includes an input layer 71, an intermediate layer (hidden layer) 72, and an output layer 73 in order from the input.

Figure 5:
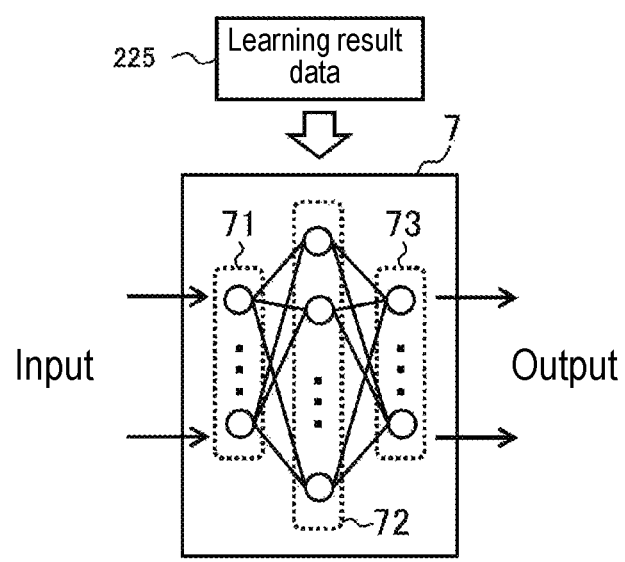
FIG. 5 is a diagram showing an example of a neural network used in the operation control device of FIG. 2.

As shown in FIG. 5, the neural network 7 includes one intermediate layer 72. The output of the input layer 71 is the input of the intermediate layer 72, and the output of the intermediate layer 72 is the input of the output layer 73. However, the number of the intermediate layers 72 is not limited to one, and the neural network 7 may include two or more intermediate layers 72.

Each of the layers 71 to 73 includes one or more neurons. For example, the number of neurons in the input layer 71 can be set according to the number of pieces of input data. The number of neurons in the intermediate layer 72 can be set as appropriate according to the embodiment. The output layer 73 can also be set according to the number of operation candidates.

The neurons in the adjacent layers are appropriately connected to each other, and a weight (connection weight) is set for each connection. In the example of FIG. 5, each neuron is connected to all the neurons in the adjacent layer, but the connection of the neurons is not limited to such an example, and may be set as appropriate according to the embodiment.

A threshold value is set for each neuron, and basically, the output of each neuron is determined by whether the sum of products of each input and each weight exceeds the threshold value. The operation control device 2 obtains an output indicating the success probability of each operation candidate from the output layer 73 by performing the above input to the input layer 71 of the neural network 7.

Information indicating the configuration of the neural network 7 (for example, the number of layers of the neural network 7, the number of neurons in each layer, the connection relationship between the neurons, and the transfer function of each neuron), the weight of the connection between the neurons, and the threshold value of each neuron is included in the learning result data 225. The operation control device 2 refers to the learning result data 225 to set the learning device that has finished learning.

Figures 6, 7:
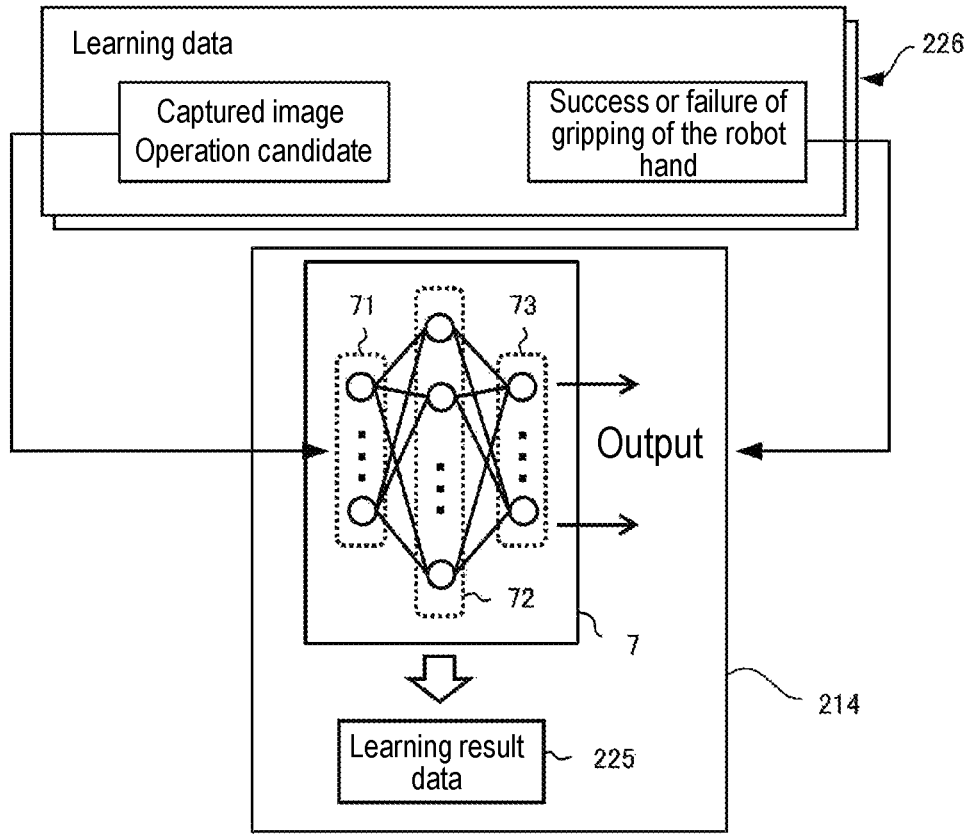
FIG. 6 is a diagram showing an example of learning of a learning device of the operation control device of FIG. 2.
FIG. 7 is an example of learning data.

Further, the learning of the first learning device 211 is performed by the learning data 226 as shown in FIG. 6, for example. In other words, the learning data 226 which inputs the captured image and the operation candidates and outputs the success or failure of the gripping of the robot hand 10 with respect thereto is used, thereby performing learning by an error propagation method or the like. FIG. 7 shows a specific example of the learning data 226. The learning data is acquired by variously combining the captured image and the operation candidates and actually driving the robot hand 10 to determine whether the gripping with respect thereto is successful. That is, when the captured image in which the robot hand 10 and the target component 50 are imaged at predetermined positions is acquired and the robot hand 10 is operated with a predetermined operation candidate with respect thereto, the learning data 226 is generated by taking the case where the robot hand 10 actually grips the target component 50 as success and taking the case where the robot hand 10 cannot grip the target component 50 as failure. For example, in FIG. 7, when the robot hand 10 is driven based on the image 1 and the operation candidate M1, the learning data indicating that the target component 50 can be gripped is included. If such learning data 226 is generated and the first learning device 211 is trained with the learning data 226, the success probability of being able to grip the target component 50, that is, the first probability value, in each operation candidate can be output. That is, the learning result data 225 for the first learning device 211 that can obtain such an output is generated. When the learning data 226 is created, the learning data 226 can be created by actually using the robot hand 10, or the learning data 226 can be created by operating a robot hand by simulation on a computer.

<2-2-4. Second Learning Device>

In the second learning device 212, learning is performed by inputting the captured image and the plurality of operation candidates so as to output the second probability value indicating the success probability that the robot hand 10 can reach the center of the target component 50 by the operation of each operation candidate. Here, the operation in which the robot hand 10 reaches the center of the target component 50 will be referred to as a second processing operation.

Similar to the first learning device 211, the second learning device 212 can be configured by a neural network, and thus detailed description thereof will be omitted. In addition, the method of learning and the generation of the learning data are substantially the same as those of the first learning device 211. For example, when the robot hand 10 is operated with various operation candidates, if the coordinates of the robot hand 10 reach a range set as the center of the target component 50, it is determined as success, and if the coordinates of the robot hand 10 do not reach the range, it is determined as failure, by which the learning data 226 can be created. That is, the second learning device 212 evaluates whether the robot hand 10 can reach the center of the target component 50 instead of evaluating whether the target component 50 can be gripped by the robot hand 10.

<2-2-5. Third Learning Device>

In the third learning device 213, learning is performed by inputting the captured image and the plurality of operation candidates so as to output the third probability value indicating the probability that the other components 51 to 53 do not move in the process in which the robot hand 10 reaches the target component 50 by the operation of each operation candidate. That is, the probability that the other components 51 to 53 do not move due to the influence of the robot hand 10 or the target component 50 is output. Here, the operation, in which the other components are not moved in the process in which the robot hand 10 reaches the target component 50, will be referred to as a third processing operation.

Here, similar to the first learning device 211, the third learning device 213 can be configured by a neural network, and thus detailed description thereof will be omitted. In addition, the learning data 226 can be generated as follows, for example.

The learning data 226 is acquired by variously combining the captured image and the operation candidates and actually driving the robot hand 10 with respect thereto to determine whether the other components 51 to 53 are moved. For example, when the captured image in which the robot hand 10 and the target component 50 are imaged at predetermined positions is acquired and the robot hand 10 is operated to move to the target component 50 with a predetermined operation candidate with respect thereto, if the other components are not moved, it is determined as 1, and if the other components are moved, it is determined as 0. FIG. 8 shows an example of the learning data. Here, there are various methods for determining whether the other components are moved. In addition to confirmation performed by a person, the following method may be adopted. For example, the components 51 to 53 are imaged before and after the robot hand 10 is operated, and the difference between these images is calculated. Then, in the images before and after the operation of the robot hand 10, if the number of pixels that are changed is equal to or larger than a predetermined reference, it can be determined that the components 51 to 53 are moved. Further, instead of outputting the probability that the other components are operated, the number of pixels that are changed before and after the operation can also be output. Alternatively, the captured image is divided into a plurality of ranges, and the change of the number of pixels before and after the operation is calculated for each of the divided ranges. Then, the third learning device 213 can be trained to output the degree of influence of the movement of the component in a range of 0 to 1 based on the change of the number of pixels for each of the divided ranges.

With the learning data 226 thus obtained, the learning of the third learning device 213 is performed as in the first embodiment. In this way, the learning result data 225 for the third learning device 213 that can obtain the above output is generated.

<2-2-6. Evaluation Part>

The evaluation part 214 determines the operation command for the robot 1 based on the probability value of each operation candidate output from each of the learning devices 211 to 213. As shown in FIG. 9, the probability values p1 to p3 of the operation candidates M1 to Mn are output from the learning devices 211 to 213 to the evaluation part 214.

Next, the evaluation values P of the operation candidates M1 to Mn are respectively calculated based on the outputs from the learning devices 211 to 213, and the operation candidate that obtains the highest evaluation value P is output to the robot 1 as the operation command. There are various methods for selecting the operation command. For example, when the success probabilities shown in FIG. 9 are output, the sum of the success probabilities p1 to p3 can be set as the evaluation value P, and the operation candidate that obtains the highest evaluation value P can be used as the operation command for the robot 1. Alternatively, the success probabilities p1 to p3 can be weighted. For example, the weights of the processing operations are set to w1, w2, and w3 considering the priorities of the first to third processing operations. Thereby, the evaluation value P of each operation candidate can be represented as $w1*p1+w2*p2+w3*p3$, and the operation candidate that obtains the highest evaluation value can be set as the operation command. The reason for setting the weight in this way is as follows. For example, if the first processing operation is very important, weighting such as $w1=0.8$, $w2=0.1$, and $w3=0.1$ can be applied. In this way, the weight can be set according to the purpose of the processing operation targeted by each of the learning devices 211 to 213. For example, if the first processing operation is a mandatory requirement and the second processing operation is a recommended requirement, the weight w1 of the output from the first learning device 211 becomes large, and the weight w2 of the output from the second learning device 212 becomes smaller than the weight w1. If the output from each of the learning devices 211 to 213 is an evaluation value other than the probability, that is, an evaluation value in a range other than 0 to 1, it is also possible to normalize the maximum value to be 1 and the minimum value to be 0, and then apply weighting to calculate the evaluation value P. For example, in the third learning device 213, if the number of pixels that has changed as described above is output, such normalization can be performed to match the range of the outputs from the first and second learning devices 211 and 212.

In addition, if the probability value is lower than a predetermined reference value, the operation candidate may not be adopted as the operation command.

<2-3. Operation of Control Device>

Figure 10:
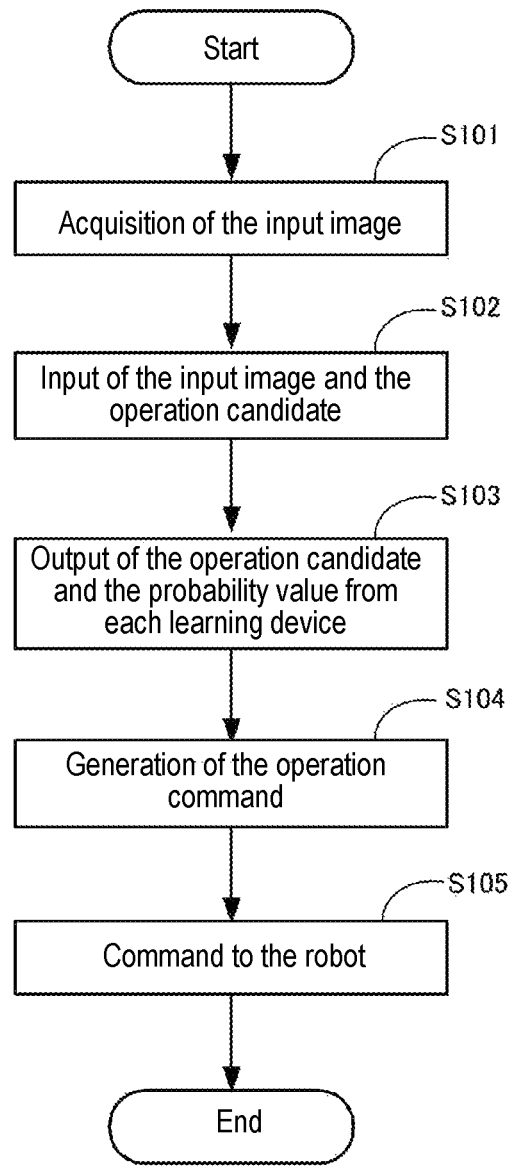
FIG. 10 is a flowchart illustrating an example of a processing procedure for updating a learning device in a motor control system of FIG. 2.

Next, an example of a control process for the robot in the operation control device 2 will be described with reference to FIG. 10. FIG. 10 is a flowchart illustrating an example of a processing procedure of the operation control device. Nevertheless, the processing procedure described below is merely an example, and each process may be changed as much as possible. Further, regarding the processing procedure described below, steps may be omitted, replaced, or added as appropriate according to the embodiment.

As shown in FIG. 10, first, the captured image is acquired by the camera 4 (step S101). Next, the acquired captured image and the operation candidates are input to each of the learning devices 211 to 213 (step S102). Then, the operation candidate and the probability value thereof are output from each of the learning devices 211 to 213 (step S103). Following this, in the evaluation part 214, the operation command is generated based on the output operation candidate and probability value (step S104). Finally, the generated operation command is transmitted to the robot 1, and the robot hand 10 is driven according to the operation command (step S105).

3. Feature

As described above, according to the present embodiment, instead of training one learning device to consider all the conditions, when a condition is added, a learning device that considers only the condition is additionally generated, and the operation command is calculated in the evaluation part 214 in consideration of the outputs of all the generated learning devices 211 to 213. Accordingly, the burden of learning of the learning devices can be reduced.

4. Modified Example

Although the embodiment of the invention has been described in detail above, the above description is merely an example of the invention in all aspects. It goes without saying that various improvements and modifications can be made without departing from the scope of the invention. For example, the following changes are possible. Hereinafter, the same reference numerals are used for constituent elements the same as those in the above embodiment, and description for aspects the same as those in the above embodiment is omitted as appropriate.

The following modified examples may be combined as appropriate.

<1>

In the above embodiment, the number of learning devices is three, but is not particularly limited if the number of learning devices is two or more. Moreover, the processing operation targeted by the first learning device 211 and the processing operations of the second and third learning devices 212 and 213 may be related to each other. For example, like the first processing operation and the second processing operation in the above embodiment, the processing operation that restricts the first processing operation may be related to become the second processing operation. In addition, like the first processing operation and the third processing operation, the processing operation related to an event that may occur due to the first processing operation may be related to become the third processing operation.

<2>

In the above embodiment, the first to third learning devices 211 to 213 are provided. However, the operation control device 2 may be configured to have the first learning device 211 and the third learning device 213, for example.

<3>

In the above embodiment, the success probability of the operation candidate is output as the evaluation value in each of the learning devices 211 to 213, but the invention is not limited thereto. That is, as the evaluation value of each operation candidate, in addition to the success probability, for example, the coordinates of the movement destination of the robot hand 10 based on each operation candidate can also be used, and the operation candidate can be evaluated by the coordinates. For example, if the coordinates of the movement destination are close to the coordinates of the target component 50, the evaluation value is high. Besides, it is possible to evaluate the operation candidate using various evaluation values and output the same from the learning devices 211 to 213.

<4>

There are various methods for selecting the operation candidates input to each of the learning devices 211 to 213 in addition to the random selection as described above. For example, the operation control device 2 is provided with an operation candidate generating part that generates operation candidates. In the operation candidate generating part, first, predetermined average and variance of the evaluation value are set, and based on these, a fixed number of operation candidates are sampled to generate a set of operation candidates. Next, the learning device is used to output the evaluation value of each operation candidate in the set, and perform ranking in descending order of evaluation values. Thereafter, some operation candidates with high ranks in the set are selected, and the average and variance of the evaluation values of the operation candidates are calculated. Then, the average and variance of the set are updated with the average and variance. By repeating this, the operation candidate with a high evaluation value can be generated.

In addition, the operation candidate generating part can prepare in advance a set of multiple operation candidates suitable for each operation of the robot hand 10, and from these, appropriately select a set of operation candidates according to the required operation of the robot hand 10.

<5>

In the above example, a general forward propagation type neural network having a multi-layered structure is used as the neural network 7. However, the type of each neural network 7 is not limited to such an example and may be selected as appropriate according to the embodiment. For example, each neural network 7 may be a convolutional neural network that uses the input layer 71 and the intermediate layer 72 as a convolutional layer and a pooling layer. For example, each neural network 7 may be a recursive neural network having a recursive connection from the output side to the input side, such as from the intermediate layer 72 to the input layer 71. The number of layers of each neural network 7, the number of neurons in each layer, the connection relationship between the neurons, and the transfer function of each neuron may be determined as appropriate according to the embodiment.

<6>

The type of each of the learning devices 211 to 213 is not particularly limited. Besides a neural network, for example, a support vector machine, a self-organizing map, or a learning device that learns by reinforcement learning can be used. Alternatively, methods other than machine learning can be used.

<7>

In the above embodiment, the operation control device 2 for the robot has been described. However, like this device, the method of generating a new learning device each time an additional condition is added, and evaluating the outputs of a plurality of learning devices can also be applied to other devices.

Figure 11:
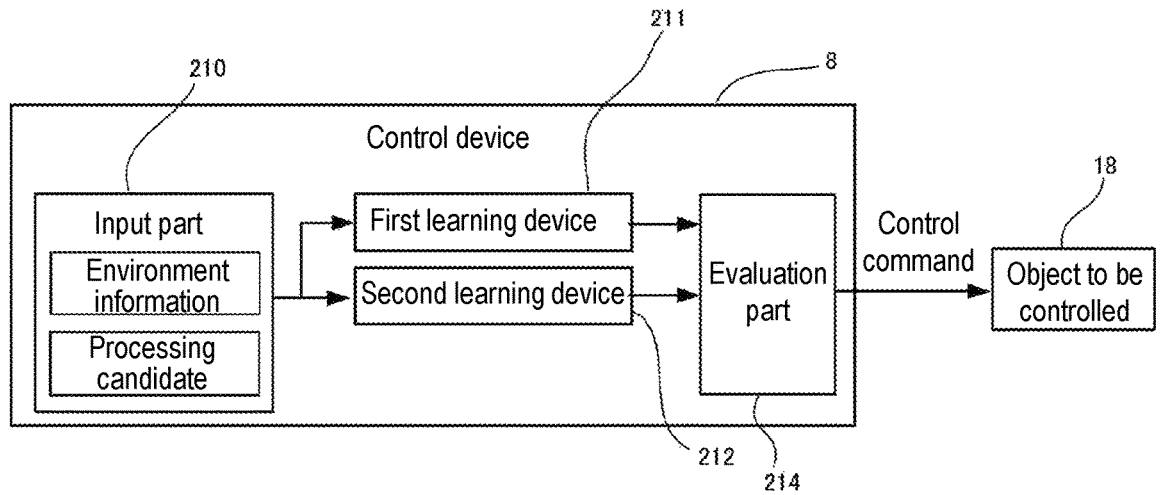
FIG. 11 is a functional block diagram of an embodiment of a control device according to the invention.

For example, the method can be applied to a control device 8 as shown in FIG. 11. The basic configuration of the control device 8 is approximately the same as the operation control device 2 for the robot described above. However, the information input to the learning device is not limited to an image, and various types of information called environment information can be input. The environment information is information related to the object to be controlled, and can be, for example, the operation speed of the object to be controlled, the position of the object to be controlled, etc. in addition to the image of the object to be controlled. Further, the processing candidate corresponds to the operation candidate and is a candidate for processing (control) on the object to be controlled.

For example, this control device can be applied to control for avoiding a collision of an automobile. In that case, the measured value such as the distance to an obstacle acquired with a measuring instrument such as a camera and a radar installed in the automobile can be used as the input environment information, and a plurality of driving operations with different steering and accelerator operation amounts can be used as the processing candidates. Then, in the first learning device 211, the probability of collision with the obstacle can be output from these inputs. Accordingly, by using the first learning device 211, it is possible to determine the driving operation that minimizes the collision probability of the automobile.

However, a driving operation that simply minimizes the collision probability may involve sudden steering or braking, so it is assumed that the load on the occupant is large. Regarding this, the second learning device 212 that outputs the degree of burden on the occupant with respect to each driving operation is generated. Then, in the evaluation part 214, a driving operation that imposes a small burden on the occupant while avoiding a collision can be determined from the outputs of the first learning device 211 and the second learning device 212. In this case, since the target of the first learning device 211 is a collision, it can be said to be a mandatory condition, and the target of the second learning device 212 can be said to be a recommended condition that has a lower priority. Accordingly, the weight of the output of the first learning device 211 is larger than the weight of the output of the second learning device 212. In addition, three or more learning devices may be provided.

<8>

Figure 12:
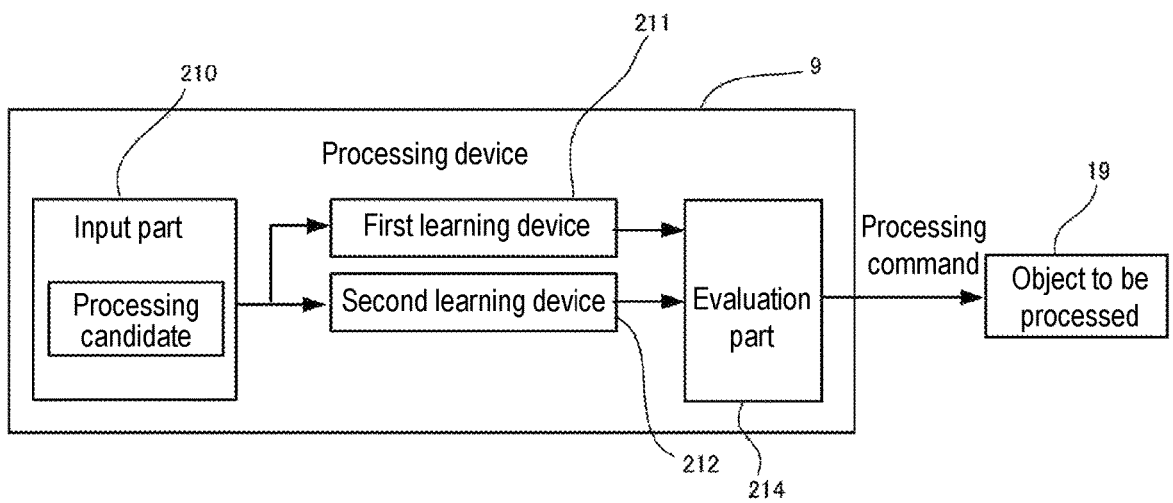
FIG. 12 is a functional block diagram of an embodiment of a processing device according to the invention.

Further, the method can be applied not only to the control of the object to be controlled, but also to the processing of an object to be processed. For example, the method can be applied to a processing device as shown in FIG. 12. The basic configuration of the processing device 9 is approximately the same as that of the control device 8 described above. However, the information input to the learning device can be the processing candidate only.

Such a processing device 9 can be applied to, for example, an image search system. For example, an image can be input as the processing candidate, and the probability that a person appears in the input image can be output by the first learning device 211. Thereby, it is possible to search for an image that shows the person. The image is also input as a processing candidate to the second learning device 212, but the second learning device 212 can output the probability that the person in the image belongs to a certain age. With the first learning device 211 and the second learning device 212, it is possible to add a narrowing function based on a person's attribute to a system that can search for an image showing the person.

What is claimed is:

1. An operation control device for a robot that operates with respect to an object to be processed, the operation control device comprising:

an input part inputting a captured image obtained by imaging at least the object to be processed, and at least one operation candidate for the robot;

a first learning device that has finished learning performed according to first learning data in order to output a first evaluation value indicating evaluation of each operation candidate when the robot performs a first processing operation upon input of the captured image and the at least one operation candidate;

a second learning device that has finished learning performed according to second learning data, which differs from the first learning data, in order to output a second evaluation value indicating evaluation of each operation candidate when the robot performs a second processing operation, which differs from the first processing operation, upon input of the captured image and the at least one operation candidate, wherein, when a new condition is added to the second processing operation, the second learning device performs re-learning to update the second evaluation value, and the first learning device does not perform re-learning; and an evaluation part calculating a command value for operating the robot based on at least one of the first evaluation value and the second evaluation value that has been updated.

2. The operation control device according to claim 1, wherein the first evaluation value is a probability value indicating a success probability of a first operation candidate, and the second evaluation value is a probability value indicating a success probability of a second operation candidate.

3. The operation control device according to claim 1, wherein the evaluation part calculates the command value based on the operation candidate in which each evaluation value is equal to or more than a predetermined value.

4. The operation control device according to claim 1, wherein the evaluation part calculates the command value by performing weighting based on each processing operation on the first evaluation value and the second evaluation value.

5. The operation control device according to claim 1, wherein the second evaluation value is an evaluation value of an event that is likely to occur due to at least one of the first processing operation and the second processing operation.

6. The operation control device according to claim 1, further comprising a third learning device that has finished learning performed according to third learning data, which differs from the first learning data and the second learning data, in order to output a third evaluation value indicating an event that is likely to occur due to at least one of the first processing operation and the second processing operation upon input of the captured image and the at least one operation candidate, wherein the evaluation part calculates the command value by using the third evaluation value as well.

7. The operation control device according to claim 1, further comprising an operation candidate generating part that outputs the first operation candidate suitable for the first processing operation and the second operation candidate suitable for the second processing operation upon input of the captured image.

8. The operation control device according to claim 1, wherein the operation candidates of the first processing operation and the second processing operation comprise a movement vector for the robot to operate.

9. A robot control system, comprising:
a robot that performs processing with respect to an object to be processed; and
the operation control device according to claim 1,
wherein the robot control system is configured for the robot to operate by a command value calculated from the operation control device.

10. An operation control method for a robot that operates with respect to an object to be processed, the operation control method comprising:
a step of inputting a captured image obtained by imaging at least the object to be processed, and at least one operation candidate for the robot;
a step of preparing a first learning device that has finished learning performed according to first learning data in order to output a first evaluation value indicating evaluation of each operation candidate when the robot performs a first processing operation upon input of the captured image and the at least one operation candidate;
a step of preparing a second learning device that has finished learning performed according to second learning data, which differs from the first learning data, in order to output a second evaluation value indicating evaluation of each operation candidate when the robot performs a second processing operation, which differs from the first processing operation, upon input of the captured image and the at least one operation candidate, wherein, when a new condition is added to the second processing operation, the second learning device performs re-learning to update the second evaluation value, and the first learning device does not perform re-learning;
a step of outputting the first evaluation value from the captured image and the operation candidate by the first learning device;
a step of outputting the second evaluation value that has been updated from the captured image and the operation candidate by the second learning device; and
a step of calculating a command value for operating the robot based on at least one of the first evaluation value and the second evaluation value that has been updated.

11. A non-transient computer-readable recording medium, recording an operation control program for a robot that operates with respect to an object to be processed, the operation control program enabling a computer to perform:
a step of inputting a captured image obtained by imaging at least the object to be processed, and at least one operation candidate for the robot;
a step of preparing a first learning device that has finished learning performed according to first learning data in order to output a first evaluation value indicating evaluation of each operation candidate when the robot performs a first processing operation upon input of the captured image and the at least one operation candidate;
a step of preparing a second learning device that has finished learning performed according to second learning data, which differs from the first learning data, in order to output a second evaluation value indicating evaluation of each operation candidate when the robot performs a second processing operation, which differs from the first processing operation, upon input of the captured image and the at least one operation candidate, wherein, when a new condition is added to the second processing operation, second learning device performs re-learning to update the second evaluation value and the first learning device does not perform re-learning;
a step of outputting the first evaluation value from the captured image and the operation candidate by the first learning device;
a step of outputting the second evaluation value that has been updated from the captured image and the operation candidate by the second learning device; and
a step of calculating a command value for operating the robot based on at least one of the first evaluation value and the second evaluation value that has been updated.

12. A control device for an object to be controlled, the control device comprising:
an input part inputting environment information related to the object to be controlled, and at least one processing candidate for the object to be controlled;
a first learning device that has finished learning performed according to first learning data in order to output a first evaluation value indicating evaluation of each processing candidate when performing a first process on the object to be controlled upon input of the environment information and the at least one processing candidate;
a second learning device that has finished learning performed according to second learning data, which differs from the first learning data, in order to output a second evaluation value indicating evaluation of each processing candidate when performing a second process, which differs from the first process, on the object to be controlled upon input of the environment information and the at least one processing candidate, wherein, when a new condition is added to the second processing operation, the second learning device performs re-learning to update the second evaluation value, and the first learning device does not perform re-learning; and
an evaluation part calculating a command value for controlling the object to be controlled based on at least one of the first evaluation value and the second evaluation value that has been updated.

13. A processing device for performing a predetermined process, the processing device comprising:
an input part inputting at least one processing candidate;
a first learning device that has finished learning performed according to first learning data in order to output a first evaluation value indicating evaluation of each processing candidate when performing a first process upon input of the at least one processing candidate;
a second learning device that has finished learning performed according to second learning data, which differs from the first learning data, in order to output a second evaluation value indicating evaluation of each processing candidate when performing a second process, which differs from the first process, upon input of the at least one processing candidate, wherein, when a new condition is added to the second processing operation, the second learning device performs re-learning to update the second evaluation value, and the first learning device does not perform re-learning; and
an evaluation part determining the processing candidate of at least one of the first process and the second process based on at least one of the first evaluation value and the second evaluation value that has been updated.

* * * * *